United States Patent [19]

Roberts

[11] Patent Number: 4,875,145

[45] Date of Patent: Oct. 17, 1989

[54] LIGHT APPARATUS FOR ANIMAL PETS

[76] Inventor: Robert E. Roberts, 2033 N. Sunset Rd., Apache Junction, Ariz. 85219

[21] Appl. No.: 182,404

[22] Filed: Apr. 18, 1988

[51] Int. Cl.$^4$ .............................................. F21L 15/08
[52] U.S. Cl. .................................... 362/103; 362/108; 362/191
[58] Field of Search ................. 362/103, 108, 190, 191

[56] References Cited

U.S. PATENT DOCUMENTS

| | | | |
|---|---|---|---|
| 2,721,257 | 10/1955 | Knox | 362/108 |
| 4,173,201 | 11/1979 | Chas et al. | 362/103 |
| 4,523,288 | 6/1985 | Morse et al. | 362/108 |

FOREIGN PATENT DOCUMENTS 2045914 11/1980 United Kingdom ................ 362/108

Primary Examiner—Stephen F. Husar
Assistant Examiner—Sue Hagarman
Attorney, Agent, or Firm—H. Gordon Shields

[57] ABSTRACT

Light apparatus includes a translucent housing with a light source disposed within the housing, and a switch extends to the outside of the housing for actuating the light. The light is battery powered, and preferably blinds to provide an intermittent flashing light for alerting persons as to the whereabouts of the user of the lamp. A hook, snap, or the like may be used to secure the light apparatus to a pet's collar.

14 Claims, 1 Drawing Sheet

U.S. Patent
Oct. 17, 1989
4,875,145
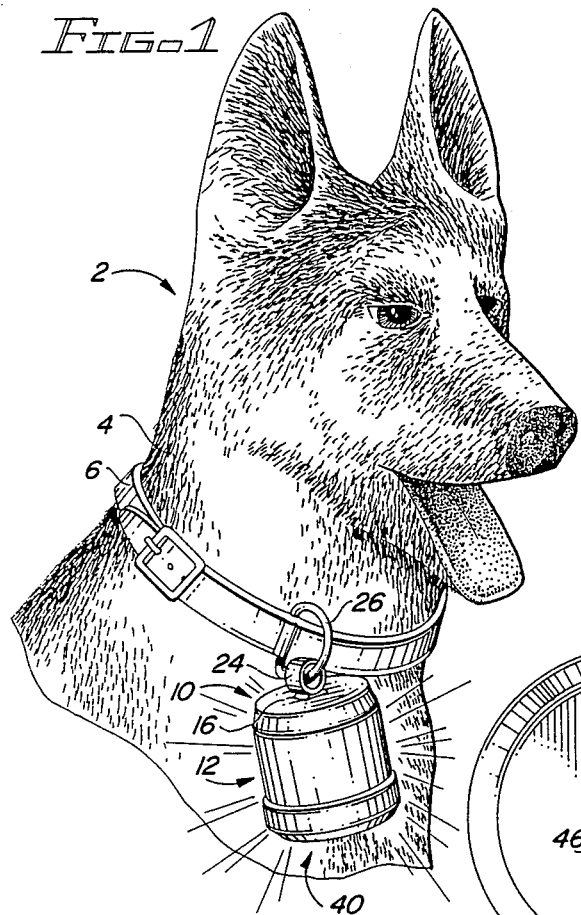
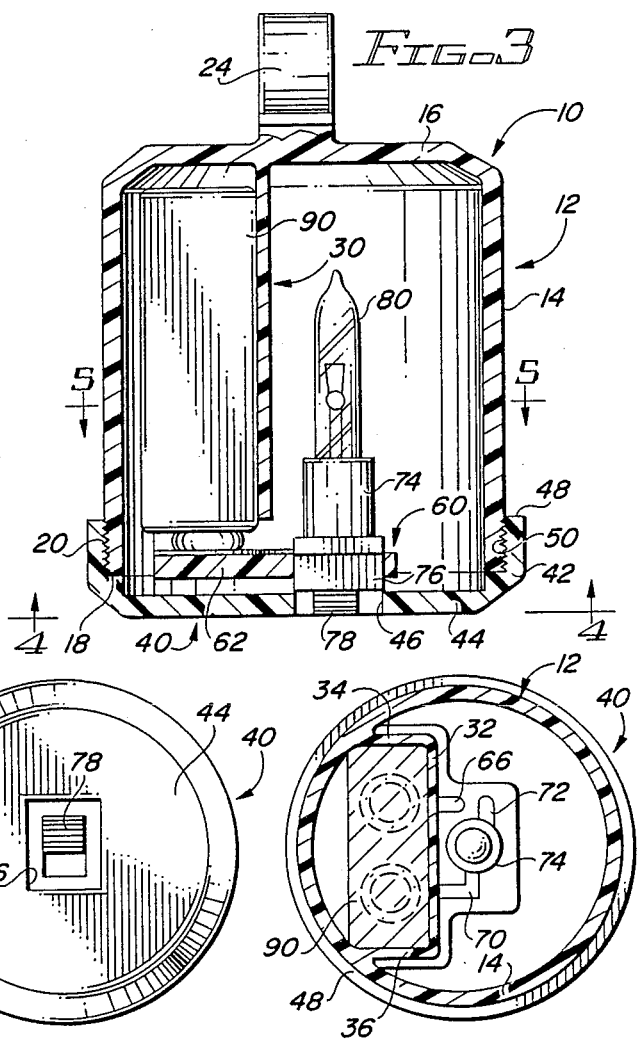
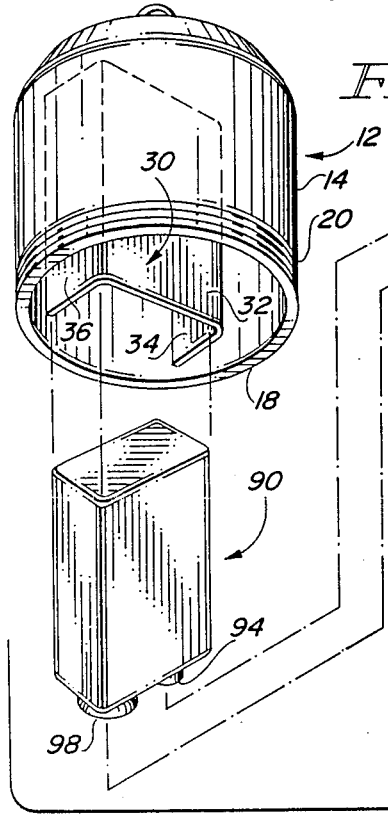
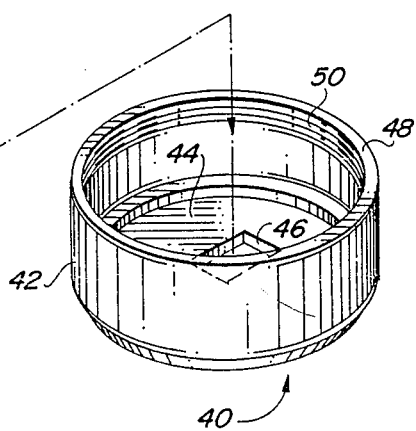

4,875,145

LIGHT APPARATUS FOR ANIMAL PETS

BACKGROUND OF THE INVENTION

1. Field of the Invention

This invention relates to lamps and, more particularly, to a lamp securable to a collar of a pet for alerting the owners and other persons of the whereabouts of the pet in darkness, such as during the night or in periods of relatively low visibility.

2. Description of the Prior Art

Pets, such as dogs, typically need to be let outdoors in the evening or during the night. In areas where there is a substantial amount of shrubbery, owners can easily lose track of the pets. Oftentimes, merely calling a pet, such as a dog, is sufficient to have the pet returned to the owner or master. However, there are many occasions when a pet may disregard a call.

Attempts to locate pets under the above-described circumstances have sometimes been singularly unsuccessful. To solve the problem, resort has been made primarily to bells, or other sound emitting elements. However, in the dark, it is often difficult to identify specifically where the sound originates. Moreover, if a pet remains relatively immobile, a bell or the like will not sound.

The apparatus of the present invention overcomes the problems of the prior art by providing a light, preferably a blinking light, which may be relatively easily secured to a pet collar.

SUMMARY OF THE INVENTION

The invention described and claimed herein comprises a translucent housing and a light disposed within the housing and preferably intermittently blinking. The light is battery operated, and the battery is also disposed within the translucent housing. The light is switch actuated, and the switch may extend outwardly from the housing.

Among the objects of the present invention are the following:

To provide new and useful light apparatus;

To provide new and useful apparatus for identifying the location of a pet in the dark;

To provide new and useful battery operated light apparatus;

To provide new and useful light apparatus in which a lamp is disposed within a translucent housing;

To provide new and useful blinking light apparatus having a translucent housing for the light; and To provide new and useful blinking light apparatus securable to a pet's collar.

BRIEF DESCRIPTION OF THE DRAWING

FIG. 1 is a perspective view illustrating the apparatus of the present invention in its use environment.

FIG. 2 is an exploded perspective view of the apparatus of the present invention.

FIG. 3 is a view in partial section of the apparatus of the present invention.

FIG. 4 is a bottom view of the apparatus of the present invention taken generally along line 4—4 of FIG. 3.

FIG. 5 is a view in partial section taken generally along line 5—5 of FIG. 3.

DESCRIPTION OF THE PREFERRED EMBODIMENT

Light apparatus 10, designed primarily for animal pets, is illustrated in FIG. 1 in its use environment. A pet, a dog 2 for illustrative purposes, is shown in FIG. 1 having a collar 6 disposed about its neck 4. Light apparatus 10 is shown secured to the collar 6 by a ring 26. The ring 26 extends from a connector 24 which is in turn secured to an end wall 16 of the apparatus 10.

The light apparatus 10 includes a housing 12, which is preferably made of translucent material, and also preferably of amber (yellow) or orange color to provide a distinctive light signal when the apparatus 10 is on, to alert owners and others of the whereabouts of the pet, such as the dog 2.

As is obvious, the ring 26 allows the light apparatus 10 to move relative to the collar 6 and to the pet 2, but the connector 24, with the ring 26, causes the housing 12, and its components, to maintain a predetermined orientation with respect to the pet 2.

The housing 12 comprises a generally cylindrical configuration, having cylindrical walls 14, as best shown in FIGS. 2, 3, and 5. The housing 12 includes the upper end wall 16. The connector 24 is secured to the end wall 16. A cap 40 closes an open or outer (bottom) end of the housing 12.

FIG. 2 is an exploded perspective view of the light apparatus 10, with its various components illustrated, separated from the housing 12. FIG. 3 is a view in partial section through the assembled light apparatus 10, illustrating the components or elements of the light apparatus 10 in their relative positions as disposed within the housing 12.

FIGS. 4 and 5 are both generally taken from FIG. 3. FIG. 4 is an end view taken generally along line 4—4 and illustrating the cap 40, while FIG. 5 is a view in partial section taken generally along line 5—5 of FIG. 3. For the following discussion, references will be made to all five of the Figures.

It will be noted that the cap 40 is secured to the housing 12 at the bottom of the housing, not at the top. Moreover, it will be noted, as best shown in FIGS. 1 and 3, that the connector 24, secured to the end wall 16 of the housing 12, is fixed in place. With the connector 24 fixed with respect to the housing 12, the orientation of the light apparatus 10 with respect to the collar 6 and to the pet 2 is also fixed. The reaosn for this is illustrated best in FIGS. 2 and 3. With the housing fixed relative to the collar 6, and also relative to the pet or dog 2, the interior elements, or the elements within the housing 12, may be predetermined so as to maximize the visibility of the light apparatus 10. That is, interior components, such as a battery 90, will not block the light output from a lamp 80 from observers.

The cylindrical walls 14, remote from the upper end wall 16, terminate in an open or outer end 18. External threads 20 are disposed on the exterior of the cylinder walls adjacent to the open end 18. The threads 20 cooperate with internal threads in the cap 40 to secure the cap 40 to the housing 12.

Within the housing 12, and secured to the cylinder walls 14, is a battery compartment 30. The battery compartment 30 includes a front wall 32 and a pair of side walls 34 and 36. The side walls 34 and 36 are in turn secured to the cylinder wall 14 of the housing 12. The battery 90 is disposed within the battery compartment 30, as shown in FIGS. 3 and 5.

The cap 40 includes a relatively short cylinder wall 42. The relatively short cylinder wall 42 is closed by an end wall 44. The end wall 44 includes an aperture 46 extending through the wall. The aperture 46 is centrally located or disposed, as will be discussed below.

The cap 40 includes an open end 48, remote from the end wall 44. The cylinder wall 42 adjacent to the end 48 includes internal threads 50. The internal threads 50 mate with the external threads 20 of the housing 12 to secure the cap 40 to the housing 12.

A circuit board 60 is secured to the battery 90 and is disposed within the housing 12 adjacent to the end 18 of the housing 12 and adjacent to the end wall 44 of the cap 40, as best shown in FIG. 3.

The circuit board 60 includes a base 62. The electrical connections or contacts for the circuitry of the apparatus are disposed on the base 62. The components include a battery contact 64 and a battery contact 68. A conductor 66 is disposed on the base 62 and extends from the contact 64 to a switch within a switch housng 76. A second battery contact 68 is also secured to the base 62. A conductor 70 extends on the base 62 from the contact 68 to a lamp socket 74. The lamp socket 74 is also appropriately secured to the base 62.

The switch housing 76 is secured to the base 62 adjacent to the lamp socket 74, but on the opposite side of the base 62 from the socket 74. The switch housing 76 includes appropriate electrical connections to open and close the electrical circuit between the battery 90 and the lamp socket 74 and to the lamp 80 disposed therein. A switch actuator 78 extends out of the housing 76 and extends through the aperture 46 in the end wall 44 of the cap 40 for turning the lamp 80 on and off.

As indicated above, the conductor 66 extends from the battery contact 64 to an appropriate terminal in the switch housing 76, not shown. See FIG. 5. A conductor 72 also extends from an appropriate terminal within the switch housing 76 to the lamp socket 74. The switch actuator 78 makes and breaks contact with the terminals within the switch housing 76 in a well known and understood manner. Essentially, the switch actuator 78 connects and disconnects the conductors 66 and 72 to connect or disconnect the battery 90 to the lamp 80 within the socket 74.

The battery 90 is illustrated as a well known and understood nine volt battery. The battery 90 includes a terminal 94 and a terminal 98. The terminal 94 is a positive terminal and makes electrical contact with the contact 64 on the base 62 of the circuit board 60. The terminal 98 is a negative terminal and it makes contact with the contact 68 on the base 62 of the circuit board 60.

It will be readily seen and understood that the circuit board 60 is easily secured to and removed from the battery 90. The battery 90, with the circuit board 60 secured thereto, and with the lamp 80 disposed within the lamp socket 74 of the circuit board 60, is then inserted into the battery compartment 30. It will be held therein by the threaded engagement between the cap 40 and the housing 12. Since the cap 40 is threaded onto the housing 12, the switch actuator 78 should be centrally located with respect to the housing 12 so that the centrally located aperture 46 of the cap 40 will be disposed about the switch actuator 78 at all times. That is, the switch housing 76 and switch actuator 78 are located on the board 60 relative to the housing 12 and the aperture 46 of the cap 40. The lamp 80 and its socket 74 may be located independently of the switch housing 76 and the switch 78, if desired, to obtain maximum visibility. On the other hand, the switch 78 is located for convenience.

While the lamp 80 is shown generally centrally located, it will be understood that it may be located radially off center, and away from the battery 90 in its compartment 30 to provide maximum visibility from as many angles as possible with respect to the housing 12 and to the pet (dog) 2.

Referring again to FIG. 1, it will be understood why the fixed connector 24 serves to orient the apparatus 10 relative to the pet 2 to optimize the visibility of the apparatus 10. The apparatus 10 maintains its orientation with respect to the pet 2 so that the lamp 80 is generally visible and away from the pet 2, and thus the body of the pet 2 does not shield the lamp 80. In order to provide maximum visibility of the apparatus 10 from various angles to which the pet 2 will be viewed, the apparatus 10 should maintain its orientation with respect to the pet 2 and the pet's collar 6. The apparatus 10 should not rotate on its longitudinal axis, but should maintain its position or altitude for maximum visibility. Accordingly, the connector 24 is in a fixed orientation on the end wall 16, and the ring 26 is in a fixed relationship with respect to the connector 24 and the collar 6, although the connection between the ring 26 and the connector 24 is not rigid, and the connector between the ring 26 and the collar 6 is similarly not rigid.

If desired, the lamp 80 may be a flashing type lamp rather than a steady lamp. Visibility may be easier if the lamp 80 flashes on and off rather than maintains a steady light output. However, it is obvious that the lamp 80 may be steady lamp, if desired. Moreover, it is also obvious that more than one lamp may be used, if desired. For example, a steady lamp and a flashing lamp may both be used. Obviously, the current drain on the battery 90 from two lamps wil be greater than from only one lamp, and battery life will be accordingly affected. However, if more than one pet is involved, variations in the lamps may be advantageous in identifying each pet.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Light apparatus for attaching to pets, comprising, in combination:

a collar fastened about a pet;

housing means, including a light transmissible portion;

means for securing the housing means to the collar in a predetermined orientation and for allowing the housing means to move relative to the pet and relative to the collar while maintaining the predetermined orientation;

light producing means disposed within the housing means for producing light transmissible through at least a portion of the housing means; and electric circuitry means selectively connected to the light producing means, including
  battery means for providing an electric current for the light producing means, and
  switch means for selectively connecting and disconnecting the battery means and the light producing means.

2. The apparatus of claim 1 in which the housing means is made of generally translucent material.

3. The apparatus of claim 1 in which the housing means is of a cylindrical configuration having an upper end wall, and the means for securing the housing means to a pet is connected to the upper end wall.

4. The apparatus of claim 3 in which the housing means further includes end cap means remote from the end wall, and the end cap means includes an aperture, and at least a portion of the switch means extends through the aperture.

5. The apparatus of claim 3 in which the housing means further includes a battery compartment, and the battery means is disposed within the battery compartment.

6. The apparatus of claim 5 in which the light producing means includes a lamp disposed adjacent to the battery compartment within the housing means.

7. The apparatus of claim 6 in which the electrical circuitry means further includes
  a circuit board;
  a lamp socket secured to the circuit board;
  battery contacts secured to the circuit board for connecting the battery means to the circuit board, including
    a first battery contact and
    a second battery contact; and
  conductor means on the circuit board, including
    a first conductor extending from the first battery contact to the lamp socket,
    a second conductor extending from the second battery contact to the switch means, and
    a third conductor extending from the switch means to the lamp socket, and the switch means is secured to the circuit board.

8. The apparatus of claim 7 in which the switch measn includes a switch housing secured to the circuit board and a switch actuator extending outwardly from the switch housing.

9. The apparatus of claim 8 in which the housing means includes an end cap having an aperture, and the switch actuator extends through the aperture.

10. The apparatus of claim 1 in which the means for securing the housing means to the collar includes
  a connector secured to the housing means, and
  a ring secured to the connector and to the collar whereby the housing means moves relative to the collar and to the pet but maintains the predetermined orientation as it moves.

11. Light apparatus attachable to a collar of a pet, comprising, in combination:
  housing means for housing light producing menas, including a light transmissible portion;
  means for securing the housing means to the collar of the pet in a predetermined orientation and for allowing the housing means to move relative to the pet and relative to the collar while maintaining the predetermined orientation;
  light producing means disposed within the housing means for producing light transmissible through at least a portion of the housing means; and
  electrical circuitry means selectively connected to the light producing means, including
    battery means for providing an electric current for the light producing means, and
    switch means for selectively connecting and disconnecting the battery means and the light producing means.

12. The apparatus of claim 11 in which the housing means includes an aperture through which at least a portion of the switch means extends.

13. The apparatus of claim 12 in which the aperture is remote from the means for securing the housing means to the collar.

14. The apparatus of claim 11 in which the housing means includes a cap, and at least a portion of the switch means is disposed in the cap.

* * * * *